(12) United States Patent
Brown et al.

(10) Patent No.: US 9,419,806 B2
(45) Date of Patent: *Aug. 16, 2016

(54) TRUSTED CERTIFICATE AUTHORITY TO CREATE CERTIFICATES BASED ON CAPABILITIES OF PROCESSES

(71) Applicant: BlackBerry Limited, Waterloo (CA)

(72) Inventors: Michael Stephen Brown, Kitchener (CA); David Francis Tapuska, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,986

(22) Filed: May 4, 2015

(65) Prior Publication Data

US 2015/0236860 A1   Aug. 20, 2015

Related U.S. Application Data

(63) Continuation of application No. 13/336,217, filed on Dec. 23, 2011, now Pat. No. 9,026,789.

(51) Int. Cl.
*H04L 29/06* (2006.01)
*H04L 9/32* (2006.01)

(52) U.S. Cl.
CPC ............ *H04L 9/3268* (2013.01); *H04L 9/3247* (2013.01); *H04L 63/0823* (2013.01)

(58) Field of Classification Search
CPC ....... G06F 21/33; G06F 21/35; G06F 21/335; H04L 9/3247; H04L 63/0823; H04W 12/06

USPC ....................... 713/152, 156; 726/4, 5, 10, 21
See application file for complete search history.

(56) References Cited

U.S. PATENT DOCUMENTS

| 8,554,175 | B2 | 10/2013 | Pecen et al. |
| 2002/0046340 | A1* | 4/2002 | Fujishiro ................ H04L 9/006 713/171 |
| 2003/0163700 | A1 | 8/2003 | Paatero |

(Continued)

FOREIGN PATENT DOCUMENTS

| EP | 1271875 | 1/2003 |
| WO | 0131836 | 5/2001 |

(Continued)

OTHER PUBLICATIONS

Engel, First Office Action for CA 2,795,428, Apr. 4, 2014.

(Continued)

*Primary Examiner* — Dede Zecher
*Assistant Examiner* — Abdullah Almamun
(74) *Attorney, Agent, or Firm* — Integral Intellectual Property Inc.; Miriam Paton; Amy Scouten

(57) ABSTRACT

A device certificate binds an identity of a first device to a public key of the first device. The first device comprises a certificate authority service that creates for a process on the first device a process certificate certifying one or more capabilities of the process on the first device. The process certificate is presented to the second device. Upon validating the process certificate using the device certificate, the second device permits the process on the first device to have on the second device one or more of the verified certified capabilities.

20 Claims, 6 Drawing Sheets

(56) References Cited

U.S. PATENT DOCUMENTS

| | | |
|---|---|---|
| 2004/0039906 A1* | 2/2004 | Oka ............... H04L 63/065 713/156 |
| 2007/0133763 A1 | 6/2007 | D'Angelo et al. |
| 2007/0147619 A1 | 6/2007 | Bellows et al. |
| 2008/0086633 A1 | 4/2008 | Anderson et al. |
| 2008/0104401 A1 | 5/2008 | Miyamoto et al. |
| 2009/0125988 A1 | 5/2009 | Evans et al. |
| 2009/0180617 A1 | 7/2009 | Peterka |
| 2010/0070754 A1 | 3/2010 | Leach |
| 2010/0077217 A1 | 3/2010 | Callaghan |
| 2010/0138652 A1 | 6/2010 | Sela et al. |
| 2010/0296441 A1 | 11/2010 | Barkan |
| 2010/0299520 A1 | 11/2010 | Murakawa |
| 2010/0318791 A1 | 12/2010 | Shamsaasef et al. |
| 2011/0271296 A1 | 11/2011 | Tu et al. |
| 2012/0008529 A1 | 1/2012 | Averbuch et al. |
| 2012/0036364 A1 | 2/2012 | Yoneda et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0096260 A1 | 4/2012 | Suzuki et al. |
| 2012/0110613 A1 | 5/2012 | Nakano et al. |
| 2013/0067223 A1 | 3/2013 | Hiroyuki et al. |

FOREIGN PATENT DOCUMENTS

| | | |
|---|---|---|
| WO | 2005/053266 | 6/2005 |
| WO | 2008/051700 | 5/2008 |

OTHER PUBLICATIONS

Forne, et al., "Pervasive authentication and authorization infrastructures for mobile users", Computers & Security 29 (2010) 501-514.

Girbea, et al., "Design and implementation of an OLE for process control unified architecture aggregating server for a group of flexible manufacturing systems", IET Softw., 2011, vol. 5, Iss. 4, pp. 406-414.

Lazaro, Extended European Search Report for EP 11191834.8, Jun. 13, 2012.

Lazaro, Extended European Search Report for EP 11195680.1, Jun. 13, 2012.

\* cited by examiner

TRUSTED CERTIFICATE AUTHORITY TO CREATE CERTIFICATES BASED ON CAPABILITIES OF PROCESSES

TECHNICAL FIELD

The following relates to creating and using certificates based on capabilities of processes.

BACKGROUND

A certificate authority may create for a server a certificate that binds an identity of the server to a public key of the server using a digital signature of the certificate authority. The server may authenticate itself to a client by presenting to the client the certificate issued by the certificate authority. The client, which is in possession of a root certificate of the certificate authority, may use the root certificate to validate the certificate received from the server.

A process or application running on a device may have one or more specified capabilities. The capabilities of a process may include permission to access specific objects or to perform operations on specific objects or both. Examples of objects include files, directories, hardware devices, and the like. Examples of operations include reading, writing, executing, and the like. The capabilities of a process may be specified in a number of different ways, including, for example, through a manifest file describing the specific capabilities, through owner permissions, through group permissions, and the like.

DETAILED DESCRIPTION

Figure 1:
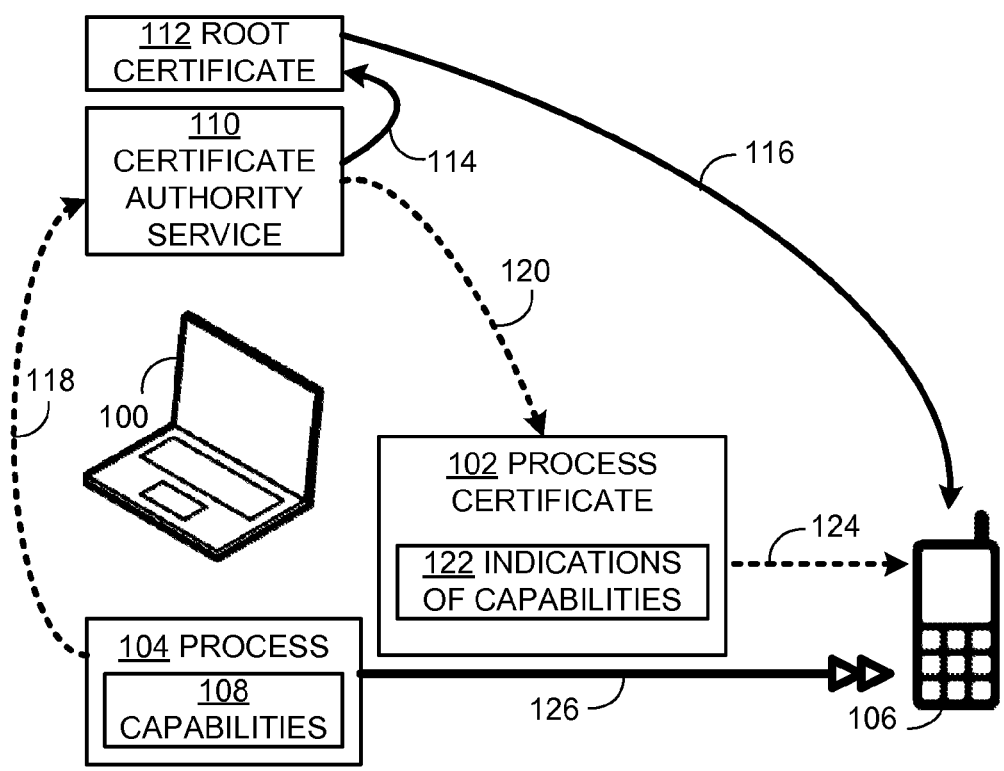
FIG. 1 is a schematic diagram illustrating a first device able to create a process certificate for a process on the first device, and a second device able to use the process certificate to permit the process on the first device to have one or more capabilities on the second device.

A certificate may be used to certify that a public key belongs to an entity, such as an electronic device or a process running on an electronic device. In one example, a first entity may be issued a certificate by an external trusted third party or certificate authority. The issued certificate binds an identity of the first entity to a public key of the first entity, where the issued certificate is digitally signed using a private key of the certificate authority. The private key of the certificate authority forms a public/private key pair with a public key of the certificate authority. A root certificate of the certificate authority binds an identity of the certificate authority to the public key. The root certificate is digitally signed using the private key of the certificate authority. The certificate authority may distribute its root certificate directly or indirectly to any entities that might seek to communicate with the first entity.

Once the first entity has received the certificate that it was issued by the certificate authority, the first entity may authenticate itself to a second entity by presenting the issued certificate. The second entity, which is in possession of the root certificate of the certificate authority, may use the root certificate to validate the certificate received from the first entity.

It is proposed in this document to have a certificate trust system that does not require the involvement of an external certificate authority or any other third party. To this end, it is proposed in this document that a device may act as its own certificate authority. Specifically, a first device may comprise a certificate authority service that it uses to issue to itself its own self-signed root certificate that binds an identity of the first device to a public key of the first device, the root certificate digitally signed using a private key of the first device, where the public key and private key form a public/private key pair. The self-signed root certificate includes an indication that it may be used for verifying digital signatures of derived certificates. The first device may use the certificate authority service to issue a derived certificate that is digitally signed using the private key. The public key in the root certificate may be used to verify the digital signature on the derived certificate. The first device may provide its root certificate to a second device in any trusted manner.

In one example, the entity that requests a derived certificate is a process or an application running on the first device. Examples of processes include instances of data communication applications, voice communication applications, messaging applications, games, calendar applications, music services, camera applications, contacts applications, instant messenger applications, memopad applications, tasks applications, and the like. Any process running on the first device may present a user interface to the user, for example via a display screen of the first device, or it may run in the background without presenting a user interface to the user. It is proposed in this document that, rather than having the process send a certificate request to an external certificate authority, the process may send the certificate request to the certificate authority service on the first device. Upon receiving the certificate request from the process, the certificate authority service of the first device may create a process certificate that binds an identity of the process to a process public key, the process certificate digitally signed using the private key corresponding to the public key in the root certificate of the first device. The process on first device may then send the process certificate to the second device, for example, using a protocol such as a Secure Sockets Layer/Transport Layer Security (SSL/TLS) protocol, and the second device may use the first device's trusted root certificate to verify the digital signature on the process certificate.

A certificate is a data structure that consists of a number of fields. The certificates used for SSL/TLS protocols generally adhere to the specifications in the document "RFC 3280 Internet X.509 Public Key Infrastructure" by Housley et al. (April 2002), which will hereinafter be referred to as the "X.509 standard". In addition to a field for a public key and for a digital signature, an X.509 certificate includes a field indicating an identity of the entity to which the certificate was issued. This indication may be comprised in either in a subject field of the certificate, as described in Section 4.1.2.6 of the X.509 standard, or a subject alternative name extension of the certificate (also known as a "subjectAltName" extension), as described in Section 4.2.1.7 of the X.509 standard, or both. The identity of the entity may be indicated in multiple ways. For example, the identity may comprise one or more of a network address, a website address, an internet protocol (IP) address, a media access control (MAC) address, a Bluetooth® address, a personal identification number (PIN), and the like. An X.509 also includes a field indicating the issuer of the certificate.

An X.509 certificate may also include one or more object identifiers (OIDs). An OID is a byte array inside the certificate which can be custom defined, which means that the meaning assigned to its contents can be defined in any way, provided it is agreed upon by those who will create and use the certificates having the OID.

A process running on a given device may have one or more capabilities, including, permission to access specific objects or to perform operations on specific objects or both. Examples of capabilities include the ability to read a file or directory in a file system of the device, the ability to write to a file or directory of the file system, the ability to execute a file in the file system, the ability to access a particular network interface of the device, the ability to communicate with a driver for a particular hardware component of the device, the ability to access a database that stores data for an application on the device, and the like. For example, the capabilities of the process may be related to the device's Access Control Lists (ACLs), to the type of account under which the process is running, such as a system account, an administrator account, or a user account, or to a particular user under which the process is running.

When requesting its process certificate from the certificate authority service, the process running on the first device may seek to have one or more of its capabilities on the first device certified by the certificate authority service so that it can present a certificate to the second device as proof of its capabilities on the first device. In one example, the process may send a request to the certificate authority service on the first device to issue a process certificate certifying that the process has specific capabilities "A", "B" and "C" on the first device. For example, the capability "A" could be that the process is permitted to access a camera of the first device, for example, in that it is permitted to send commands to a driver of the camera; the capability "B" could be that the process is permitted to access a calendar of the first device, for example, in that it is permitted read-only access to a file or database where calendar data are stored; and the capability "C" could be that the process is permitted to modify the calendar of the first device, for example, in that it is permitted to modify settings of the calendar application or permitted read-write access to a file or database where calendar data are stored. The certificate authority service may verify that the process does indeed possess the purported capabilities A, B and C on the first device. For example, the certificate authority service may query one or more ACLs or determine an account under which the process is running. This may be part of the security of the operating system of the first device, which may require a way to verify locally that a process has a particular capability in order to enforce its local security model. Once the certificate authority service has verified the purported capabilities of the process on the first device, the certificate authority service may issue to the process a process certificate that includes indications of the verified capabilities of the process on the first device. For example, the certificate authority service may encode indications of the capabilities in one or more existing or newly-defined OIDs of the process certificate. Thus, the process certificate that is issued by the certificate authority service certifies one or more capabilities of the process on the first device. The process certificate is digitally signed using the private key corresponding to the public key in the root certificate of the first device.

It is proposed in this document that the process on the first device may present its process certificate to a second device, for example, via a SSL/TLS protocol, where the second device is already in possession of the trusted root certificate of the first device, and that, upon validating the process certificate, the second device may permit the process on the first device to have on the second device one or more of the capabilities indicated in the process certificate. In other words, the second device may determine that, if the process has certain certified capabilities on the first device, the process should be permitted to have one or more of those same capabilities on the second device. The process on the first device cannot actually run on the second device, but it may make requests via some interface exposed by the second device to perform any actions it seeks to perform. In one example, the second device may expose a web-style interface to the actions it supports and the process on the first device could make one or more requests via this web-style interface. For example, the connection to the web-style interface may be made via an SSL/TLS protocol, and as part of that protocol, the process certificate of the process on the first device may be transferred to the second device for verification. The second device may then examine the received process certificate to determine whether the request is "authorized". More specifically, the second device may verify the digital signature of the process certificate and verify that the process certificate satisfies any other requirements. If the request is authorized, the second device may permit the process on the first device to have one or more capabilities on the second device. Thus, in the example above, the second device may permit the process on the first device to access a camera of the second device, to access a calendar of the second device, and to modify the calendar of the second device, where these capabilities correspond to the capabilities "A", "B" and "C" encoded in the process certificate.

In another example, when there is more than one process running on a device, a first process on the device may present its process certificate to a second process running on the same device. Upon validating the first process certificate using the root certificate of the first device, the second process may permit the first process to have the capabilities indicated in the process certificate. For example, the first process may open a secure connection to the second process using a protocol such as SSL and make similar requests over that connection as described above. This might occur, for example, in a case where a downloaded calendar add-on application seeks to access the calendar database. Rather than permitting the add-on to access the calendar database directly, the calendar application might expose a local web-style interface and require connections via SSL.

It will be appreciated that the capabilities of a process should be encoded in its process certificate in such a manner that they can be deciphered by another process or another device to which the process certificate is presented. For example, two devices seeking to share resources in this manner may have a fixed set of capabilities explicitly defined in advance of sharing the resources, for example, the capabilities "A", "B", and "C" described above. Each of these capabilities may be identified in the process certificate by a unique identifier which may be understood by the device to which the process certificate is presented. In another example, if the two devices share a common layout for a portion of the file system, for example, if they are both running the same operating system, a capability encoding may include the path to a specific file in the file system, along with the permitted capabilities that the process has on the first device.

In addition to having a first device issue to itself its own self-signed root certificate which it provides to a second device in any trusted manner, the second device may perform analogous actions. Specifically, the second device may issue to itself its own self-signed root certificate which it provides to the first device in any trusted manner so that the first device can authenticate a process certificate created by a certificate authority service on the second device.

FIG. 1 is a schematic diagram illustrating a first electronic device 100 able to create a process certificate 102 for a process 104 on the first device 100, and a second electronic device 106 able to use the process certificate 102 to permit the process 104 on the first device 100 to have one or more capabilities on the second device 106.

The first device 100 may comprise a certificate authority service 110 which may issue a root certificate 112 to the first device 100, as denoted by arrow 114. The root certificate 112 binds an identity of the first device 100 to a public key (not shown), the root certificate 112 digitally signed by a private key (not shown). The first device 100 may provide its self-signed root certificate 112 to the second device 106 in any trusted manner, as denoted by arrow 116.

At some point, the process 104 may request from the certificate authority service 110 a certificate to certify that the process 104 possesses one or more capabilities 108 on the device 100. The certificate request is denoted by arrow 118. After verifying that the process 104 does indeed possess the one or more capabilities 108 that the process purports to possess, the certificate authority service 110 may create the process certificate 102, as denoted by arrow 120. The process certificate 102 is digitally signed using a private key (not shown) that corresponds to the public key in the root certificate 112 of the first device 100. The process certificate 102 also comprises indications 122 of the capabilities 108 that have been verified by the certificate authority service 110.

After being issued the process certificate 102, the process 104 may send the process certificate 102 to the second device 106, as denoted by arrow 124. The second device 106 may use the trusted root certificate 112 of the first device 100 to verify the digital signature of the process certificate 102. The second device 106 may also verify that the process certificate 102 satisfies any other necessary requirements. If the second device 106 successfully verifies the digital signature of the process certificate 102 and determines that the process certificate 102 satisfies any other necessary requirements, the second device 106 may permit the process 104 to have the capabilities indicated by the indications 122 of verified capabilities. For example, if all of the capabilities 108 of the process 104 are verified by the certificate authority service 110 and the corresponding indications 122 of capabilities are included in the process certificate 102, the second device 106 may permit the process 104 to have the same capabilities 108 on the second device 106 as it has on the first device 100. This is indicated by arrow 126. Alternatively, if the second device 106 is not able to verify the digital signature of the process certificate 102 using the trusted root certificate 112 of the first device 100, or if the second device 106 determines that the process certificate 102 does not meet one or more other necessary requirements, the second device 106 may prevent the process 104 from having some or all of the capabilities 108 on the second device 106 that the process 104 has on the first device 100. The technology will now be described in more detail with respect to FIGS. 2-6.

Figure 2:
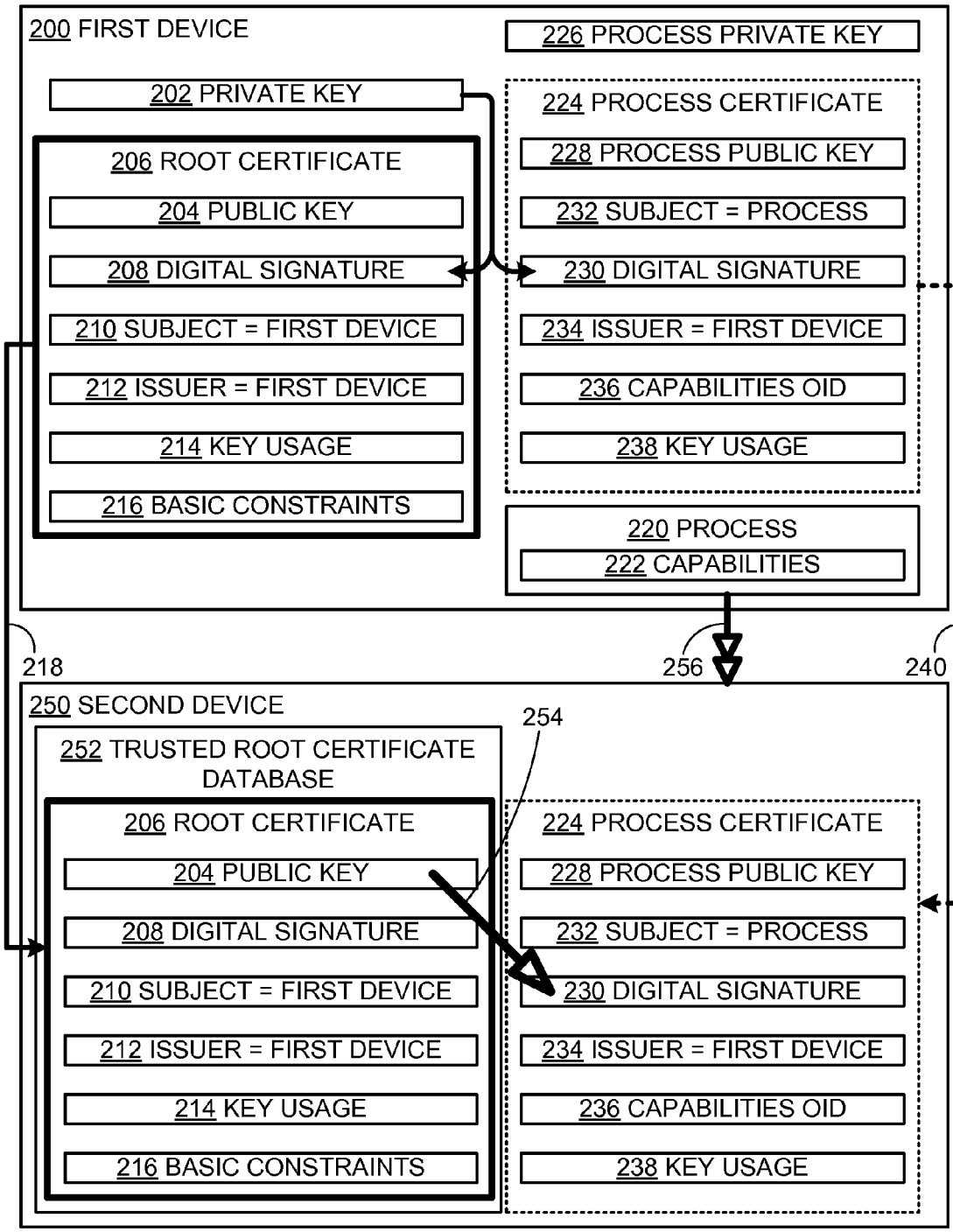
FIG. 2 is a schematic diagram illustrating an example procedure for creating a process certificate for a process on a first device and using the process certificate to permit the process on the first device to have one or more capabilities on a second device.

FIG. 2 is a schematic diagram illustrating an example procedure for creating a process certificate 224 for a process 220 on a first electronic device 200 and using the process certificate 224 to permit the process 220 on the first device 200 to have one or more capabilities 222 on a second electronic device 250. The first device 200 is an example of the first device 100, and the second device 250 is an example of the second device 106.

Figure 3:
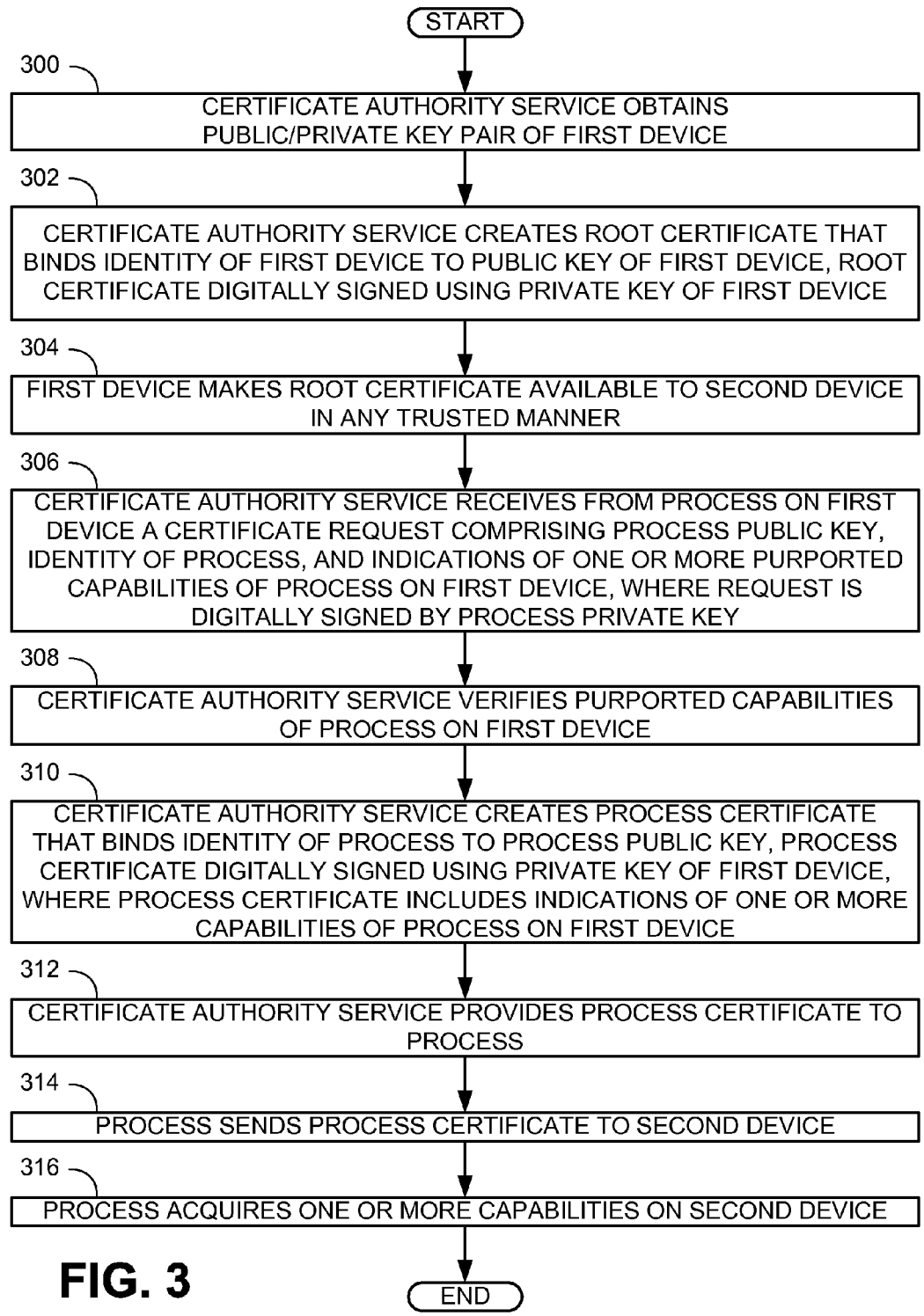
FIG. 3 is a flow diagram illustrating an example method in a first device for creating a process certificate for a process of the first device for a purpose of having the process acquire one or more capabilities on a second device.

FIG. 3 is a flow diagram illustrating an example method in the first device 200 for creating the process certificate 224 for the process 220 of the first device 200.

The method begins at 300 by having a certificate authority service of the first device 200 obtain a public/private key pair consisting of a private key 202 and a public key 204. In one example, the first device 200 uses a random, pseudo-random or quasi-random number generator to generate the private key 202, and then computes the public key 204 as a function of the private key 202. For example, the private key 202 and the public key 204 may be obtained using an Elliptic Curve Cryptography (ECC)-based protocol. In this case, the private key 202 would be an integer randomly or pseudo-randomly selected within an interval [1, n–1] and the public key 204 would be determined from a scalar multiplication of the private key 202 and a base point G on an elliptic curve E defined over a prime finite field $F_p$ that has order n or defined over the finite field $F_2m$, which is a binary representation with $2^m$ elements. While the point multiplication used to calculate the public key 204 from the private key 202 and the base point G is relatively straightforward, the inverse of this operation is extremely difficult. In general, ECC-based protocols rely on the difficulty of this operation.

In another example, a third party, such as a certificate authority, may be involved in having the first device 200 obtain the public/private key pair, as is the case, for example, with implicit certificates.

At 302, the certificate authority service of the first device 200 creates a self-signed root certificate 206 that binds an identity of the first device 200 to the public key 204 that was obtained at 300. The root certificate 206 is digitally signed with a digital signature 208 using the private key 202 that was obtained at 300. In one example, the digital signature 208 may be created by applying a Ron Rivest, Adi Shamir and Leonard Aldeman (RSA) algorithm to one or more elements of the root certificate 206 or to a hash thereof, and effectively using the private key 202 as an encryption key. In another example, the digital signature 208 may be created by applying an Elliptic Curve Digital Signature Algorithm (ECDSA) algorithm to a hash of the root certificate 206.

In addition to fields for a public key and for a digital signature, an X.509 certificate comprises a number of other standard fields, including, for example, a field indicating a subject of the certificate and another field indicating an issuer of the certificate. In the case of the root certificate 206, the subject field 210 indicates an identity of the first device 200 and the issuer field 212 also indicates an identity of the first device 200. In general, when a certificate is self-signed, the subject of the certificate and the issuer of the certificate will be the same. In the case that the root certificate 206 is an X.509 certificate, it may alternatively or additionally comprise an indication of the first device 200 in a "subjectAltName" extension (not shown), as described previously.

The self-signed root certificate 206 includes an indication that it may be used for verifying digital signatures of process certificates and optionally that it may be used for verifying digital signatures on certificate revocation lists. An X.509 certificate may comprise extension fields indicative of how the certificate is to be used. For example, a certificate may comprise one or more key usage extension fields which define the purpose(s) of the certificate's public key, where each key usage is indicated by a bit. In this case, for the root certificate 206, the first device 200 may assert the "keyCertSign" bit in a key usage extension field 214 to indicate that the public key 204 is permitted to be used for verifying a signature on a public key certificate. Assertion of the "keyCertSign" bit in the key usage extension field 214 will allow the root certificate 206 to be used by the second device 250 to verify a signature on a process certificate received from the first device 200, as will be described below. The first device 200 may also optionally assert the "cRLsign" bit in the key usage extension field 214 to indicate that the public key 204 is permitted to be used for verifying a signature on a certificate revocation list.

In accordance with the X.509 standard, the root certificate 206 may also comprise a basic constraints extension field 216 which indicates whether the public key 204 belongs to a certificate authority (CA). If the "keyCertSign" bit is asserted, then the X.509 standard requires that the "cA" bit in the basic constraints extension field 216 also be asserted. The root certificate 206 may comprise additional elements which, for clarity, are not shown in FIG. 2.

At any point after creating the root certificate 206, the first device 200 may provide the root certificate 206 to the second device 250 in any trusted manner, as indicated by arrow 218 in FIG. 2 and as indicated at 304 in FIG. 3. In one example, the first device 200 may provide the root certificate 206 to the second device 250 using a universal serial bus (USB) connection. In another example, the root certificate 206 may be imported from the first device 200 by the second device 250 over an insecure wireless local area network connection, such as an insecure Wi-Fi® connection, and a user of the first device 200 and of the second device 250 could manually (for example, visually) compare the root certificate 206 on the first device 200 to the root certificate imported by the second device 250 to ensure that the root certificates are identical, thereby verifying the authenticity of the root certificate using an out-of-band means. In yet another example, the first device 200 may provide the root certificate 206 to the second device 250 over a secure wireless personal area network connection, such as a Bluetooth® connection, established between the first device 200 and the second device 250. There may be other suitable methods of making the root certificate of the first device 200 available to the second device 250 in a trusted manner.

Once the root certificate 206 of the first device 200 has been received by the second device 250 in any trusted manner, the second device 250 may store the root certificate 206 in a trusted root certificate database 252. A trusted root certificate database is generally implemented in a file system that has restricted privileges. In one example, the trusted root certificate database 252 comprises a directory containing certificates in the Distinguished Encoding Rules (DER) format. When the first device 200 seeks to determine if a received certificate is trusted, it may examine the files in the directory to determine if there is a trusted root certificate that is identical to the received certificate. The trusted root certificate database 252 may store additional trusted root certificates (not shown), each one received in any trusted manner from one or more devices.

There may be a process 220 running on the first device 200. The process 220 is an instance of a computer program that is being executed by the first device 200. More specifically, the first device 200 stores code which is executable by a processor of the first device as the process 220. Examples of processes include instances of data communication applications, voice communication applications, messaging applications, games, calendar applications, music services, camera applications, contacts applications, instant messenger applications, memopad applications, tasks applications, and the like. Any process running on the first device may present a user interface to the user, for example via a display screen of the first device, or it may run in the background without presenting a user interface to the user. The process 220 may have one or more capabilities 222 on the first device 200. Examples of capabilities include the ability to read a file or directory in a file system of the device, the ability to write to a file or directory of the file system, the ability to execute a file in the file system, the ability to access a particular network interface of the device, the ability to communicate with a driver for a particular hardware component of the device, the ability to access a database that stores data for an application on the device, and the like.

The capabilities of the process 220 may be related to the device's ACLs, to the type of account under which the process is running, such as a system account, an administrator account, or a user account, or to a particular user account under which the process is running.

At 306, the certificate authority service of the first device 200 may receive a certificate request from the process 220 on the first device, where the certificate request may include an identity of the process 220 and a process public key 226, as well as indications of any attributes requested for the certificate. In this case, the requested attributes include indications of one or more purported capabilities 222 of the process 220 that the process 220 seeks to have certified. The certificate request may optionally be digitally signed using a process private key 228 that forms a process public/private key pair with the process public key 226. In one example, the first device 200 uses a random, pseudo-random or quasi-random number generator to generate the process private key 226, and then computes the process public key 228 as a function of the process private key 226. For example, the process private key 226 and the process public key 228 may be generated using an ECC-based protocol, as described previously. Alternatively, there may be an alternate trust mechanism between the certificate authority service of the first device 200 and the process 220. For example, the certificate authority service may automatically trust all certificate requests received from processes on the first device 200.

At 308, the certificate authority service may verify that the process 220 does indeed possess the purported capabilities 222 indicated in the certificate request.

Once the certificate authority service has verified the purported capabilities 222 of the process 220 on the first device 200, the first device creates at 310 a process certificate 224 that binds an identity of the process to the process public key that was received at 306. The process certificate 224 is digitally signed with a digital signature 230 using the private key 202 that was obtained at 300. The digital signature 230 may be created, for example, by using the private key 202 as an encryption key in an RSA algorithm that is applied to one or more elements of the process certificate 224 or to a hash thereof. In another example, the digital signature 230 may be created by applying an ECDSA algorithm to a hash of the process certificate 224.

In accordance with the X.509 standard, the process certificate 224 may comprise a signed version of the certificate request received from the process 220 at 306. Also in accordance with the X.509 standard, the process certificate 224 may indicate in its subject field 232 an identity of the process 220. Alternatively or additionally, an identity of the process 220 may be indicated in a "subjectAltName" extension (not shown) of the process certificate 224, as described previously. In its issuer field 234, the process certificate 224 may indicate that it was issued by the first device 200. Importantly, the process certificate 224 may be encoded with indications of one or more of the verified capabilities 222 of the process 220, in the form of one or more existing or newly-defined capabilities OIDs 236. The process certificate 224 may comprise additional elements which, for clarity, are not shown in FIG. 2.

At 312, the certificate authority service may provide the process certificate 224 to the process 220. In one example, the process 220 could open a socket to the certificate authority service to write the certificate request, and then the certificate authority service could respond on that socket with the process certificate 224, or alternatively with an indication that the process certificate could not be issued.

In order for the process 220 to authenticate itself to the second device 250 and to potentially acquire on the second device 250 any of the one or more capabilities indicated in the capabilities OIDs 236 of the process certificate 224, the process 220 may provide the process certificate 224 to the second device 250, as indicated by arrow 240 in FIG. 2 and as shown at 314 in FIG. 3. This may be done, for example, via a SSL/TLS protocol. Although not explicitly shown in FIG. 3, in one example, the first device 200 may send the process certificate 224 to the second device 250 in response to a request from the second device 250 for the process 220 to authenticate itself to the second device 250. In the case of an SSL/TLS protocol with client authentication, this may be built in. If, as described with respect to FIG. 4, the second device 250 successfully verifies the digital signature 230 of the process certificate 224 using the trusted root certificate 206 of the first device 200, and if certain other requirements are satisfied, the process 220 may be permitted on the second device 250 to have one or more of the one or more capabilities indicated in the capabilities OIDs 236 of the process certificate 224, as shown at 316.

Figure 4:
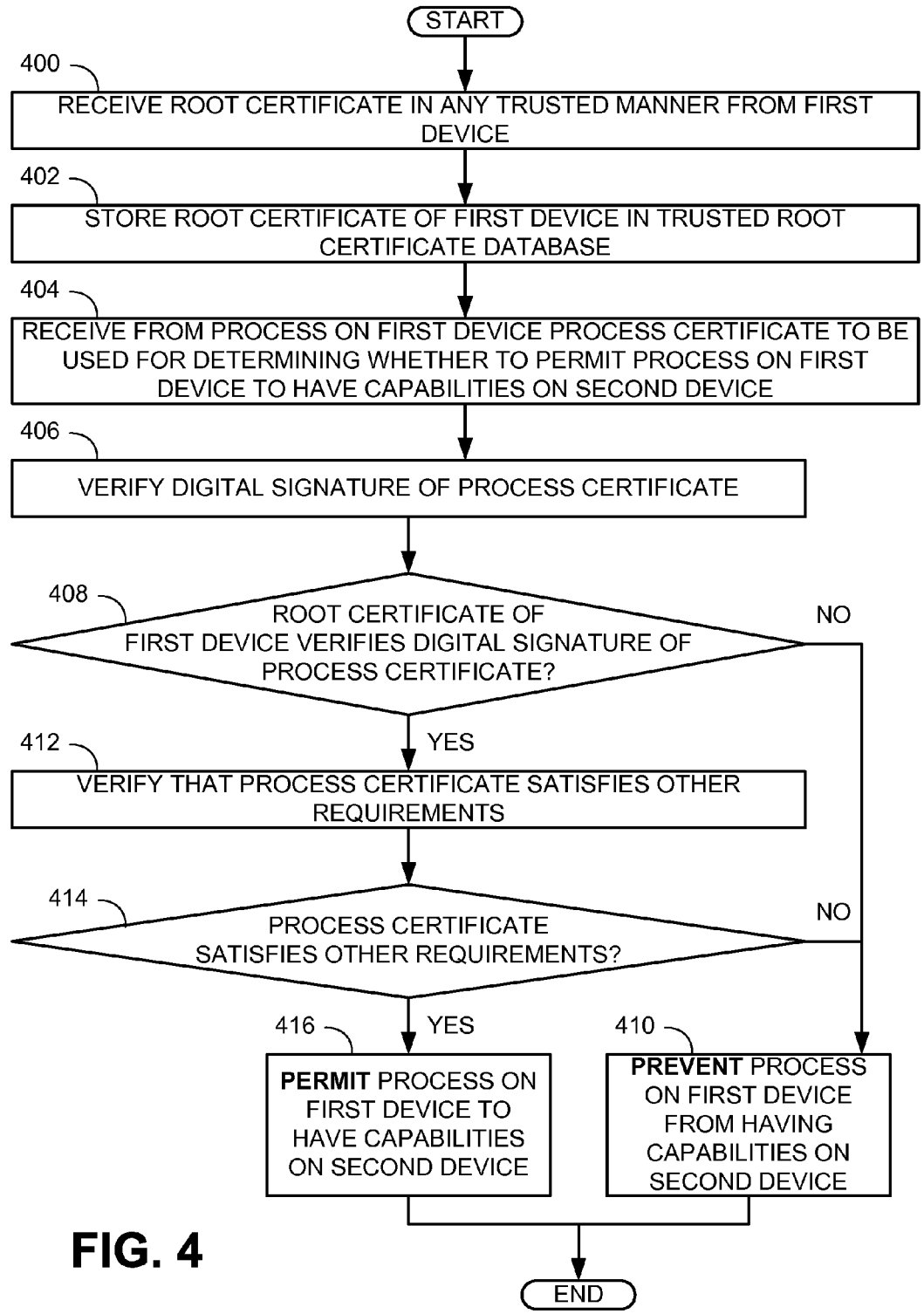
FIG. 4 is a flow diagram illustrating an example method in a second device for using a process certificate created for a process on a first device to permit the process on the first device to have one or more capabilities on the second device.

FIG. 4 is a flow diagram illustrating an example method in a second device 250 for using a process certificate 224 created for a process 220 on a first device 200 to permit the process 220 on the first device 200 to have one or more capabilities on the second device 250.

The method begins at 400 by having the second device 250 receive a root certificate 206 of the first device 200 in the trusted manner described with respect to FIG. 3.

At 402, the second device 250 stores the root certificate 206 of the first device 200 in its trusted root certificate database 252.

At some point after storing the root certificate 206 of the first device 200 at 402, the second device 250 may receive a certificate 224, as shown at 404. Although not shown in FIG. 4, the received certificate 224 may be received in response to the second device 250 sending a request to a process 220 on the first device 200 for the process 220 to authenticate itself to the second device 250. The received certificate 224 binds an identity of the process 220 to a process public key 228, and is digitally signed with a digital signature 230. The received certificate 224 may also include indications of one or more purported capabilities of the process 220 on the first device 200.

Upon receipt of the certificate 224, as shown at 404, the second device 250 may proceed to use the received certificate 224 in an attempt to authenticate the process 220 from which the certificate 224 was received.

At 406, the second device 250 may verify the digital signature 230 of the received certificate 224 by determining whether the root certificate 206 of the first device 200 verifies the digital signature 230 of the received certificate 224. More specifically, the second device 250 may determine from the issuer field 234 that the issuer of the process certificate 224 is the first device 200. The second device 250 may proceed to locate a root certificate in the trusted root certificate database 252 that stores an identifier of the first device 200 in its subject field. In this simple example, the second device 250 determines that the subject field 210 of the root certificate 206 stores an identifier of the first device 200. Since the issuer indicated in the issuer field 234 of the received certificate 224 is identical to the subject indicated in the subject field 210 of the root certificate 206 (namely, the first device 200), the second device 250 may proceed to use the public key 204 of the root certificate 206 to verify the digital signature 230 of the certificate 224 that was received at 404, as indicated by arrow 254 in FIG. 2. The second device 250 may verify the digital signature 230 using the public key 204 in the root certificate 206.

Although not explicitly shown in FIG. 4, the second device 250 may check that the public key 204 of the root certificate 206 is permitted to be used for verifying the digital signature 230. For example, in accordance with X.509 standard, the second device 250 may check that the key usage extension field 214 of the root certificate 206 includes an asserted "keyCertSign" bit. In addition, the second device 250 may check that the basic constraints extension field 216 of the root certificate 206 includes an asserted "cA" bit.

Also, although not explicitly shown in FIG. 4, the second device 250 may check that process public key 228 of the received certificate 224 is permitted to be used for authentication. For example, in accordance with the X.509 standard, the second device 250 may check that a key usage extension field 238 of the received certificate 224 includes an asserted "digitalSignature" bit. In the case of an SSL/TLS protocol, depending on how the session key is to be negotiated, the second device 250 may also check that the key usage extension field 238 of the received certificate 224 includes an asserted "keyAgreement" bit (where the received certificate 224 has been digitally signed using an ECDSA signature scheme) or an asserted "dataEncipherment" bit (where the derived certificate has been digitally signed using an RSA algorithm).

The second device 250 may determine the one or more purported capabilities of the process 220 from the one or more capabilities OIDs 236 in the received certificate 224. If it is determined at 408 that the root certificate 206 of the first device 200 does not verify the digital signature of the certificate received at 404, the second device 250 may determine at 410 that it should prevent the process 220 on the first device 200 from having one or more capabilities on the second device 250 and the method may end. In one example, the second device 250 may prevent the process 220 from having any capabilities on the second device 250. In another example, the second device 250 may prevent the process 220 from having one or more of the capabilities indicated in the capabilities OID 236 of the received certificate 224.

However, if it is determined at 408 that the root certificate 206 of the first device 200 successfully verifies the digital signature 230 of the certificate received at 404, the second device 250 may proceed to verify at 412 that the process certificate 224 satisfies one or more other requirements. In another example, the second device 250 may optionally verify that the received certificate 224 is associated with an identity of an authorized device or an authorized user or both. This verification may be implicit as part of the determination that the received certificate 224 was signed by a root certificate in the trusted root certificate database 252. In yet another example, the received certificate 224 may comprise an identity, such as a device identity or an owner identity, that the second device 250 may present to a user of the second device 250, for example, via a user output component of the second device 250 such as a display (not shown), so that the user may determine whether the process 220 should be permitted to have one or more capabilities on the second device 250.

If it is determined at 414 that the received certificate 224 does not satisfy one or more of the other requirements, the second device 250 may determine at 410 that it should prevent the process 220 on the first device 200 from having one or more capabilities on the second device 250 and the method may end. However, if it is determined at 414 that the received certificate 224 satisfies the other requirements, the second device 250 may determine at 416 that it should permit the process 220 on the first device 200 to have one or more capabilities indicated in the capabilities OIDs 236 on the second device 250. This is indicated by arrow 256 in FIG. 2, which shows that the process 220 may have one or more of the same capabilities on the second device 250 as it does on the first device 200.

Verification of the digital signature 230 of the received certificate 224 at 406 and verification that the received certificate 224 satisfies other requirements at 412 may be performed in a different order than that illustrated in FIG. 4. For example, the determination at 408 as to whether the root certificate 206 of the first device 200 verifies the digital signature 230 of the received certificate 224 may alternatively be performed after the determination at 414 as to whether the received certificate 224 satisfies other requirements. Although not explicitly shown, additional actions may be performed by the second device 250 prior to permitting the process 220 on the first device 200 to have one or more capabilities on the second device 250. Similarly, additional actions may be performed by the second device 250 prior to preventing the process 220 on the first device 200 from having any capabilities on the second device 250.

Once the second device 250 has validated the process certificate 224 received at 404, the second device 250 may proceed to use the process certificate 224 to communicate with the process 220 on the first device 200 in a secure and trusted manner. For example, the second device 250 may use the process public key 228 from the process certificate 224 to encrypt data to be sent to the process 220 on the first device 200. The second device 250 is assured that the process public key 228 in the process certificate 224 truly belongs to the process 220 on the first device 200 and therefore that the message can only be decrypted by the process private key 226 stored on the first device 200.

The methods illustrated in FIG. 3 and FIG. 4 may be combined to share capabilities of processes on the same device or on different devices. For example, in addition to having the first device 200 provide its root certificate 206 to the second device 250 in any trusted manner and sending a process certificate 224 to the second device 250, the first device 200 may also receive a root certificate (not shown) of the second device 250 in any trusted manner and may receive a process certificate (not shown) from the second device 250. Once mutual authentication of processes has been achieved, the process 220 on the first device 200 and the process (not shown) on the second device 250 may be able to establish a secure connection. For example, the process 220 on the first device 200 and the process on the second device 250 may use one another's process public keys in a key agreement protocol, such as a Diffie-Hellman protocol, to establish a shared secret that can be used for symmetric encryption. It is noted that this is accomplished without the involvement of an external certificate authority or any other third party. Rather, it is a peer-to-peer process.

In a variation of the methods described with respect to FIG. 3 and FIG. 4, a first process 220 on the first device 200 may send its process certificate to a second process (not shown) on the first device 200. The second process on the first device 200 may verify the digital signature 230 of the process certificate 224 using the root certificate 206 of the first device 200, which the first device 200 possesses. Upon successfully authenticating the process certificate 224 and determining that the process certificate 224 satisfies any other requirements, the second process may permit the first process 220 to have one or more capabilities in the second process, for example, using an SSL/TLS protocol or some similar communication protocol.

Figure 5:
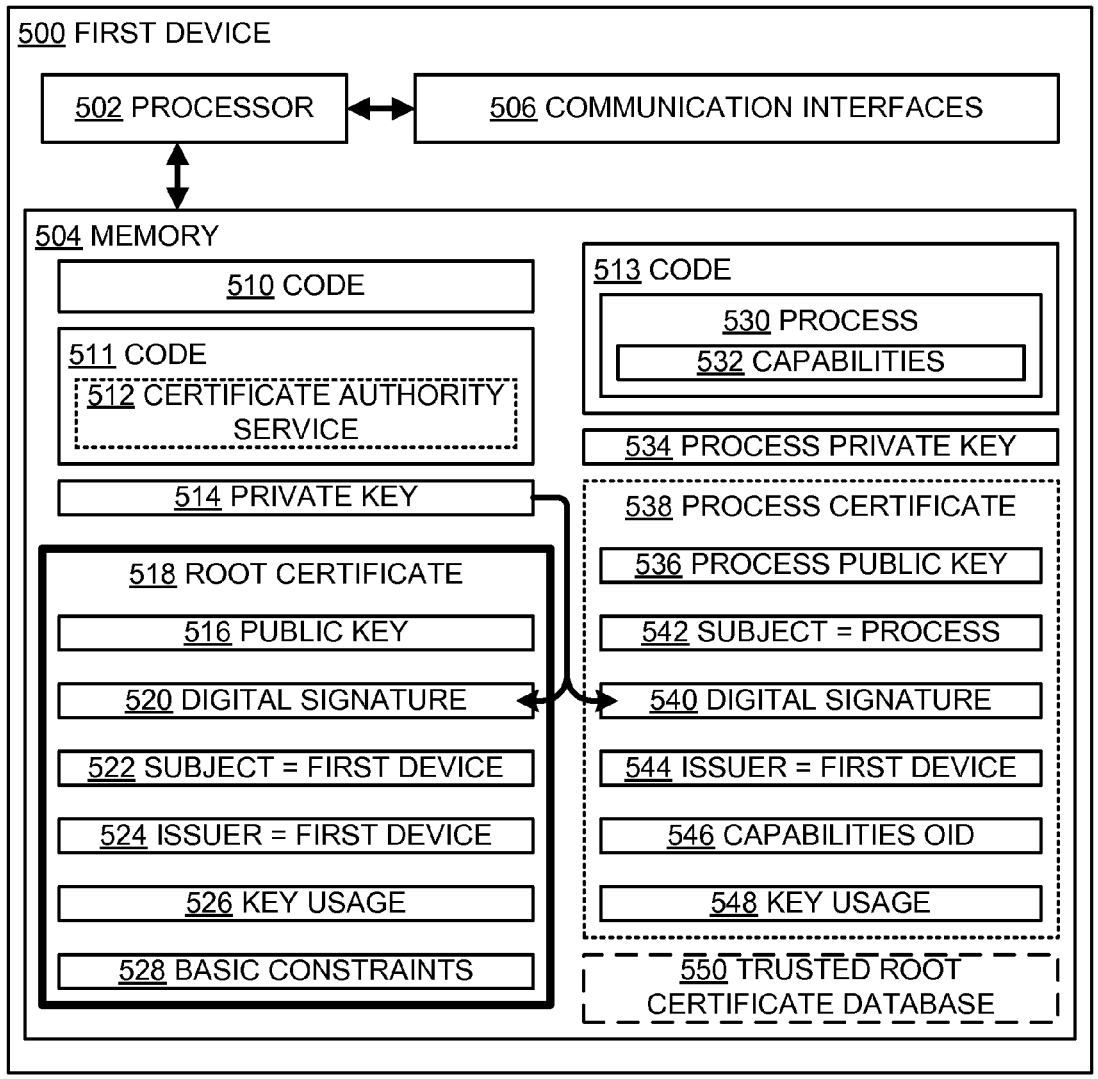
FIG. 5 is a block diagram of an example first device.

FIG. 5 is a block diagram of an example first device 500. The first device 500 may contain other elements which, for clarity, are not shown in FIG. 5.

The first device 500 is an example of one or both of the devices 100 and 200. The first device 500 comprises a processor 502 which is coupled to a memory 504 and to one or more communication interfaces 506 through which it is operable to communicate with one or more other devices.

The communication interfaces 506 may comprise one or more wired communication interfaces, wireless communication interfaces or both. For example, the one or more communication interfaces 506 may comprise any of a Universal Serial Bus (USB) interface, an Ethernet interface, an Integrated Services Digital Network (ISDN) interface, a Digital Subscriber Line (DSL) interface, a Local Area Network (LAN) interface, a High-Definition Multimedia (HDMI) interface, a Digital Visual Interface (DVI), or an Institute of Electrical and Electronics Engineers (IEEE) 1394 interface such as an i.LINK™, Lynx$^{SM}$ or Firewire® interface. Alternatively, the communication interface 506 may be a Wireless Local Area Network (WLAN) interface, a short-range wireless communication interface such as a Wireless Personal Area Network (WPAN) interface, a Wireless Wide Area Network (WWAN) interface, or a Wireless Metropolitan Area Network (WMAN) interface.

The memory 504 is operable to store code 510 that, when executed by the processor 502, results in the example method illustrated in FIG. 3. The memory 504 is also operable to store code 511 that, when executed by the processor 502, executes a certificate authority service 512 that is configured to obtain a public/private key pair consisting of a private key 514 and a public key 516. While the certificate authority server 512 is primarily software, it may use one or more hardware modules (not shown) for improved speed. The certificate authority service 512 is configured to create a self-signed root certificate 518 that binds an identity of the first device 500 to the public key 516. The root certificate 518 is digitally signed by the certificate authority service 512 with a digital signature 520 using the private key 514. The self-signed root certificate 518 includes a subject field 522 indicating an identity of the first device 500, and an issuer field 524 indicating an identity of the first device 500. Alternatively or additionally to an identity of the device 500 being indicated in the subject field 522, the root certificate 518 may comprise an indication of an identity of the device 500 in a "subjectAltName" extension (not shown), as described previously. The self-signed root certificate 518 also includes an indication that it may be used for verifying digital signatures of process certificates. In accordance with the X.509 standard, the certificate authority service 512 may be configured to assert a "keyCertSign" bit in a key usage extension field 526 of the root certificate 518 and to assert a "cA" bit in a basic constraints extension field 528 of the root certificate 518. The root certificate also optionally includes an indication that it may be used for verifying digital signatures on certificate revocation lists. For example, in accordance with the X.509 standard, the certificate authority service 512 may be configured to assert a "cRLsign" bit in the key usage extension field 526 of the root certificate 518. The memory 504 is operable to store the private key 514 and the root certificate 518.

The memory 504 is also operable to store code 513 which is executable by the processor 502 as a process 530 that has one or more capabilities 532 in the first device 500. The memory 504 may store code for other processes (not shown) to be executed by the processor 502, where each process has one or more capabilities on the first device 500. Examples of processes include instances of data communication applications, voice communication applications, messaging applications, games, calendar applications, music services, camera applications, contacts applications, instant messenger applications, memopad applications, tasks applications, and the like. Examples of capabilities include the ability to read a file or directory in a file system of the first device 500, the ability to write to a file or directory of the file system, the ability to execute a file in the file system, the ability to access a particular network interface of the first device 500, the ability to communicate with a driver for a particular hardware component of the first device 500, the ability to access a database that stores data for an application on the first device 500, and the like.

The certificate authority service 512 is configured to receive a certificate request from the process 530, where the certificate request may comprise an identity of the process 530 and a process public key 536, as well as indications of any attributes requested for the certificate. In this case, the attributes include indications of one or more purported capabilities 532 of the process 530 that the process 530 seeks to have certified. The certificate request may optionally be digitally signed using a process private key 534 that forms a process public/private key pair with the process public key 536. In one example, the first device 500 uses a random, pseudo-random or quasi-random number generator to generate the process private key 534, and then computes the process public key 536 as a function of the process private key 534. For example, the process private key 534 and the process public key 536 may be generated using an ECC-based protocol, as described previously. Alternatively, there may be an alternate trust mechanism between the certificate authority service 512 and the process 530. For example, the certificate authority service 512 may automatically trust all certificate requests received from processes on the first device 500.

In response to the certificate request from the process 530, the certificate authority service 512 is configured to verify that the process 530 does indeed possess the purported capabilities 532 indicated in the certificate request. Upon verification of the purported capabilities 532, the certificate authority server 512 is configured to create a process certificate 538 that uses a digital signature 540 to bind an identity of the process to the process public key 536. The digital signature 540 is applied by the certificate authority service 512 using the private key 514. A subject field 542 of the process certificate 538 indicates an identity of the process 530, and an issuer field 544 of the process certificate 538 indicates an identity of the first device 500. Importantly, the process certificate 538 comprises indications of one or more of the one or more purported capabilities 532 of the process 530, in the form of one or more capabilities OIDs 546. The process certificate 538 may also include an indication that the process public key 536 is permitted to be used for authentication. For example, according to the X.509 standard, the process certificate 538 may comprise a key usage extension field 548 that includes an asserted "digitalSignature" bit. In the case of an SSL/TLS protocol, depending on how the session key is to be negotiated, the key usage extension field 548 may also include an asserted "keyAgreement" bit (where the process certificate 538 has been digitally signed using an ECDSA signature scheme) or an asserted "dataEncipherment" bit (where the process certificate 538 has been digitally signed using an RSA algorithm).

The memory 504 is operable to store the process private key 534 and the process certificate 538. Although not shown in FIG. 5, the memory 504 may be operable to store other process certificates issued for other processes on the first device 500.

The first device 500 is configured to send its self-signed root certificate 518 to one or more other devices in any trusted manner via one or more of the one or more communication interfaces 506. The first device 500 is also configured to send the process certificate 538 to one or more other devices via one or more of the one or more communication interfaces 506. The root certificate 518 and the process certificate 538 may be sent via the same one of the one or more communication interfaces 506, or, in the case that there is more than one communication interface 506, the root certificate 518 and the process certificate 538 may be sent via different communication interfaces 506.

Alternatively or additionally, the first device 500 may be configured to provide the process certificate 538 to one or more other processes (not shown) on the first device 500.

The memory 504 is optionally operable to store a trusted root certificate database 550 comprising one or more trusted root certificates received from one or more other devices via one or more of the one or more communication interfaces 506. As described previously, the trusted root certificate database 550 may be implemented in a file system that has restricted privileges. For example, the trusted root certificate database 550 may comprise a directory containing certificates in the DER format. It may possible to prevent tampering of the trusted root certificate database 550 via user permissions on the file system.

Figure 6:
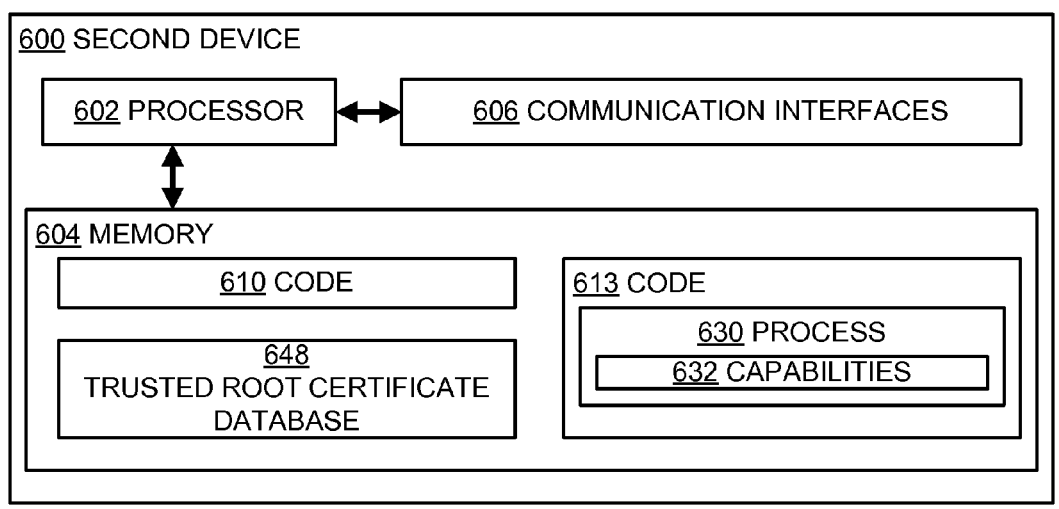
FIG. 6 is a block diagram of an example second device.

FIG. 6 is a block diagram of an example second device 600. The second device 600 may contain other elements which, for clarity, are not shown in FIG. 6.

The second device 600 is an example of one or both of the devices 106 and 250. The second device 600 comprises a processor 602 which is coupled to a memory 604 and to one or more communication interfaces 606 through which it is operable to communicate with one or more other devices.

The communication interfaces 606 may comprise one or more wired communication interfaces, wireless communication interfaces or both. For example, the one or more communication interfaces 606 may comprise any of a Universal Serial Bus (USB) interface, an Ethernet interface, an Integrated Services Digital Network (ISDN) interface, a Digital Subscriber Line (DSL) interface, a Local Area Network (LAN) interface, a High-Definition Multimedia (HDMI) interface, a Digital Visual Interface (DVI), or an Institute of Electrical and Electronics Engineers (IEEE) 1394 interface such as an i.LINK™, Lynx$^{SM}$ or Firewire® interface. Alternatively, the communication interface 606 may be a Wireless Local Area Network (WLAN) interface, a short-range wireless communication interface such as a Wireless Personal Area Network (WPAN) interface, a Wireless Wide Area Network (WWAN) interface, or a Wireless Metropolitan Area Network (WMAN) interface.

The memory 604 is operable to store code 610 that, when executed by the processor 602, results in the example method illustrated in FIG. 4. The memory 604 is also operable to store code 613 which is executable by the processor 602 as a process 630 that has one or more capabilities 632 in the second device 600. The memory 604 may store code for other processes (not shown) to be executed by the processor 602, where each process has one or more capabilities on the second device 600. Examples of processes include instances of data communication applications, voice communication applications, messaging applications, games, calendar applications, music services, camera applications, contacts applications, instant messenger applications, memopad applications, tasks applications, and the like. Examples of capabilities include the ability to read a file or directory in a file system of the second device 600, the ability to write to a file or directory of the file system, the ability to execute a file in the file system, the ability to access a particular network interface of the second device 600, the ability to communicate with a driver for a particular hardware component of the second device 600, the ability to access a database that stores data for an application on the second device 600, and the like.

The memory 604 is operable to store means for permitting or preventing a process from having capabilities. For example, if the process 630 exposes a web-style interface then it can explicitly decide whether to grant or to deny a request for a particular capability.

The memory 604 is operable to store a trusted root certificate database 648 comprising one or more trusted root certificates received from one or more other devices via one or more of the one or more communication interfaces 606.

The second device 600 is configured to receive one or more self-signed root certificates, such as the root certificate 618, from one or more other devices in any trusted manner via one or more of the one or more communication interfaces 606. The one or more trusted root certificates may be stored in a trusted root certificate database 648. The trusted root certificate database 648 may be implemented in similar manner to the trusted root certificate database 550, as described with respect to FIG. 5.

The second device 600 is also configured to receive one or more process certificates, such as the process certificate 638, from one or more other devices via one or more of the one or more communication interfaces 606. Any of the root certificates and any of the process certificates may be received via the same one of the one or more communication interfaces 606, or, in the case that there is more than one communication interface 606, they may be received via different communication interfaces 606.

It is noted that, in the case that the methods illustrated in FIG. 3 and FIG. 4 are combined to share capabilities of processes on different devices, the memory 604 of the second device 600 may store additional elements corresponding to those stored in the memory 504 of the first device 500. For example, the memory 604 of the second device 600 may be operable to store code (not shown) that, when executed by the processor 602, results in the example method illustrated in FIG. 3. Similarly, the memory 604 may be operable to store code (not shown) that, when executed by the processor 602, executes a certificate authority service configured to create a self-signed root certificate and a process certificate that are analogous to the root certificate 518 and the process certificate 538, respectively, described with respect to FIG. 5. The second device 600 may be configured to send its root certificate (not shown) and the process certificate (not shown) to one or more other devices via one or more of the one or more communication interfaces 606 in an analogous manner to that described with respect to FIG. 5.

The root certificate described above may be considered a device certificate for the device whose certificate authority service has issued the self-signed root certificate.

The foregoing teaching can be modified as follows. Instead of the first device's certificate authority service issuing a self-signed root certificate, the device may obtain a device certificate from an external certificate authority or other third party. The device certificate may be obtained through a communication interface of the first device or any other means, including, for example, the device certificate being installed directly at the first device. The device certificate binds an identity of the first device to a public key of the first device. The private key of the first device, which forms a public/private key pair with the public key of the first device, is used by the first device's certificate authority service to digitally sign derived certificates (e.g. process certificates) that are issued by the first device's certificate authority service. Thus the public key in the device certificate may be used to verify the digital signature of the derived certificate. The device certificate may include an indication that it may be used for verifying digital signatures of certificates. The first device may provide its device certificate to a second device. Provision of the device certificate to the second device need not be in a trusted manner, because the second device will use a root certificate of the external certificate authority or other third party to verify the received device certificate. The device certificate need not be stored in a trusted root certificate database at the second device. The root certificate of the external certificate authority or other third party may be provided to the second device in any trusted manner. Alternatively, there may be a chain of certificates between a trusted root certificate and the device certificate.

APPENDIX A

APPENDIX A is an example X.509 root certificate.
Data:
Version: 3 (0x2)
Serial number: c2:cf:8e:2f:6d:96:9e:d0:8a:a0:87:80:fa:12:1f:c8
Signature algorithm: ecdsa-with-SHA1
Issuer: CN=My Playbook (EC)
Validity
Not Before: December 9 15:49:40 2011 GMT
Not After: December 3 15:49:40 2035 GMT
Subject: CN=My Playbook (EC)
Subject Public Key Info:
Public Key Algorithm: id-ecPublicKey
Public-Key: (521 bit)
pub:
04:00:63:64:92:0e:a6:61:18:77:f1:86:fe:8b:66:70:95:b4:59:
d3:6b:a8:1a:f5:25:2d:12:71:ff:f8:89:74:54:d8:a0:41:dd:74:
2b:6f:35:03:5b:7f:10:ff:c2:f9:7f:b5:d2:d9:a3:8e:1f:29:3
6:36:14:3c:fd:ec:8d:83:c7:54:29:00:d8:a7:ce:95:4a:89:0e:
95:1f:68:5a:84:81:5c:a1:5a:8e:4e:bc:c2:42:67:5a:3a:01:4f:
21:34:d9:63:93:37:68:8f:c4:9d:1d:00:4a:1c:a4:53:28:27:7
6:00:d8:54:47:a9:14:c7:d8:22:d0:59:b8:d2:74:45:85:c7:e3:
d4:d2
ASN1 OID: secp521r1
X509v3 extensions:
X509v3 Basic Constraints: critical
CA:TRUE
X509v3 Subject Key Identifier:
82:D0:B0:E0:D9:8C:3B:E6:6E:35:4E:64:EB:35:90:CD:18:E3:EC:E5
X509v3 Authority Key Identifier:
keyid:82:D0:B0:E0:D9:8C:3B:E6:6E:35:4E:64:EB:35:90:CD:18:E3:EC:E5
X509v3 Key Usage: critical Digital Signature, Non Repudiation, Certificate Sign, CRL Sign
Signature Algorithm: ecdsa-with-SHA1
30:81:88:02:42:00:a6:90:07:a4:10:8d:ee:6a:0a:a0:7c:a6:98:
47:bd:e7:14:a2:30:a4:f8:d9:9c:c6:3b:1f:7f:58:22:a8:14:a8:
40:45:f7:b2:05:61:2e:1d:ff:e6:d8:61:e8:60:df:fd:07:61:6a:
2f:7b:51:a7:95:5d:0b:fe:9c:9f:e7:b7:7f:7d:02:42:00:96:34:
68:bb:2b:7d:3b:c2:81:2d:d    b:71:8e:54:77:bd:d6:df:82:83:
11:55:cb:aa:8e:09:a9:da:a0:d8:d5:6f:30:e4:7c:5e:4c:17:f
d:7e:e8:9d:ff:2e:5d:70:f8:93:ed:cd:2c:02:94:67:0c:2d:36:
0a:42:bf:3b:16:60:c9:1e

APPENDIX B

APPENDIX B is an example X.509 process certificate that is digitally signed by the example X.509 root certificate of Appendix A.
Data:
Version: 3 (0x2)
Serial Number: 1048577 (0x100001)
Signature Algorithm: ecdsa-with-SHA1
Issuer: CN=My Playbook (EC)
Validity
Not Before: December 13 17:08:31 2011 GMT
Not After: December 12 17:08:31 2012 GMT
Subject: CN=PIM access
Subject Public Key Info:
Public Key Algorithm: id-ecPublicKey
Public-Key: (521 bit)
pub:
04:00:74:3e:7b:30:46:96:79:71:5d:2f:45:42:1e:6a:8c:07:1e:
5d:68:c5:aa:00:a5:ac:f7:ed: 93:65:d7:37:b3:0b:0c:34:d6:0c:
3f:36:94:12:ff:aa:c1:fc:34:be:4d:ef:c9:2a:65:8a:a2:4d:9
0:92:96:e3:f7:2e:4c:57:65:5c:c9:00:7e:b1:bc:7e:a5:8b:3e:
14:10:31:f5:c2:35:53:1 e:4a:2 4:1 c:cb:e8:25:d7:6d:69:cf:91:
7d:c0:2e:35:12:0c:aa:25:81:8c:b2:4c:73:5b:81:ea:31:43:7e:
23:81:5c:d6:3c:25:76:c1:e8:47:ed:d8:f7:4c:43:4e:24:1e:50:
3f
ASN1 OID: secp521r1
X509v3 extensions:
1.3.6.1.4.1.3530.55.1: critical
... apps
1.3.6.1.4.1.3530.55.2: critical
.$/dev/accel,/dev/camera1,/dev/camera2
Signature Algorithm: ecdsa-with-SHA1
30:81:88:02:42:01:39:1e:a4:73:5f:58:fe:81:2b:03:4f:26:b1:
62:09:d2:79:fa:51:27:9f:35:2d:82:3b:b1:b5:a4:a8:87:d8:96:
11:44:84:e8:62:88:0f:57:5a:2e:40:3d:ec:08:82:24:2c:9e:b6:
b310:e2:20:f9:df:99:e5:6a:cf:f1:45:e7:3a:02:42:01:47:20:
e8:f4:84:cf:05:e9:ed:3d: 75:b3:a7:1c:b7:1e:b2:d6:97:dc:57:
e9:44:d516:56:3c:c2:5e:84:e5:04:82:e0:7a17:b4:b4:17:87:
e1:50:6a:00:11:6e:71:07:12:c9:93:9a:64:2d:58:a4:8a:cc:34:
b3:c1:22:70:9a:df

What is claimed is:

1. A non-transitory computer-readable medium storing a certificate authority service which, when executed by a processor of a first device, is configured to:
receive from a process on the first device a process certificate request comprising an indication of an identity of the process, a process public key, and an indication of one or more capabilities purported to be possessed by the process on the first device;
verify any of the one or more capabilities purported to be possessed by the process on the first device; and
create a process certificate that binds the identity of the process to the process public key, the process certificate comprising indications of the verified capabilities, the process certificate digitally signed using a private key of the first device that, together with a public key of the first device, forms a public/private key pair; and
wherein the computer-readable medium further stores code which, when executed by the processor, causes the first device to:
make a device certificate available to a second device in any manner via any one of one or more communication interfaces of the first device, wherein the device certificate binds an identity of the first device to the public key of the first device.

2. The non-transitory computer-readable medium as recited in claim 1, wherein the code, when executed by the processor, causes the first device to:
send the process certificate to the second device via any one of the one or more communication interfaces for a purpose of the process acquiring the verified capabilities on the second device.

3. The non-transitory computer-readable medium as recited in claim 1, wherein the certificate authority service, when executed by the processor, is further configured to:
indicate in the device certificate that the device certificate is usable for verifying digital signatures of certificates.

4. The non-transitory computer-readable medium as recited in claim 1, wherein the process certificate request is digitally signed using a process private key that, together with the process public key, forms a process public/private key pair.

5. The non-transitory computer-readable medium as recited in claim 1, wherein the one or more capabilities comprise any one of an ability to read a file or directory in a file system, an ability to write to a file or directory of a file system, an ability to execute a file in a file system, an ability to access a network interface, an ability to communicate with a driver for a hardware component, or an ability to access a database that stores data for an application.

6. The non-transitory computer-readable medium as recited in claim 1, wherein the process is an instance of any one of a data communication application, a voice communication application, a messaging application, a game, a calendar application, a music service, a camera application, a contacts application, an instant messenger application, a memopad application, or a tasks application.

7. The non-transitory computer-readable medium as recited in claim 1, wherein the device certificate is a self-signed root certificate.

8. The non-transitory computer-readable medium as recited in claim 1, wherein the device certificate is signed by an external certificate authority or other third party.

9. The non-transitory computer-readable medium as recited in claim 1, wherein the certificate authority service, when executed by the processor, is configured to verify at least one of the one or more capabilities purported to be possessed by the process on the first device by querying an access control list on the first device.

10. The non-transitory computer-readable medium as recited in claim 1, wherein the certificate authority service, when executed by the processor, is configured to verify at least one of the one or more capabilities purported to be possessed by the process on the first device by determining an account under which the process is running on the first device.

11. A non-transitory computer-readable medium storing code which, when executed by a processor of a first device, is configured to:
store a device certificate of a second device, wherein the device certificate of the second device binds an identity of the second device to a public key of the second device;

receive from a process on the second device a process certificate that binds an identity of the process to a process public key and that indicates that the process certificate was issued by the second device, the received process certificate comprising indications of one or more purported capabilities of the process on the second device, wherein the process certificate is digitally signed;

use the public key of the device certificate to verify a digital signature of the process certificate;

make a determination whether to permit the process on the second device to have any of the one or more purported capabilities on the first device; and in accordance with the determination, permitting or preventing the process on the second device to have any of the one or more purported capabilities on the first device.

12. The non-transitory computer-readable medium as recited in claim 11, wherein the device certificate includes an indication that the device certificate is permitted to be used for verifying digital signatures of certificates.

13. The non-transitory computer-readable medium as recited in claim 11, wherein the code, when executed by the processor, is further configured to:

determine that the process certificate satisfies one or more requirements prior to permitting the process on the second device to have any of the one or more purported capabilities on the first device.

14. The non-transitory computer-readable medium as recited in claim 11, wherein the one or more capabilities comprise any one of an ability to read a file or directory in a file system, an ability to write to a file or directory of a file system, an ability to execute a file in a file system, an ability to access a network interface, an ability to communicate with a driver for a hardware component, or an ability to access a database that stores data for an application.

15. The non-transitory computer-readable medium as recited in claim 11, wherein the process is an instance of any one of a data communication application, a voice communication application, a messaging application, a game, a calendar application, a music service, a camera application, a contacts application, an instant messenger application, a memopad application, or a tasks application.

16. The non-transitory computer-readable medium as recited in claim 11, wherein the device certificate of the second device is a self-signed root certificate.

17. The non-transitory computer-readable medium as recited in claim 11, wherein the device certificate of the second device is signed by an external certificate authority or other third party.

18. A process certificate embodied as a data structure in a non-transitory computer-readable medium, the process certificate binding an identity of a process to a process public key of a first device, the process certificate comprising an indication of one or more verified capabilities possessed by the process on the first device, the one or more capabilities having been verified by a certificate authority service of the first device, the process certificate comprising a digital signature obtained using a private key of the first device, and the process certificate for use by a second device in determining whether to permit the process to acquire the one or more capabilities on the second device.

19. The process certificate as recited in claim 18, wherein the one or more capabilities comprise any one of an ability to read a file or directory in a file system, an ability to write to a file or directory of a file system, an ability to execute a file in a file system, an ability to access a network interface, an ability to communicate with a driver for a hardware component, or an ability to access a database that stores data for an application.

20. The process certificate as recited in claim 18, wherein the process is an instance of any one of a data communication application, a voice communication application, a messaging application, a game, a calendar application, a music service, a camera application, a contacts application, an instant messenger application, a memopad application, or a tasks application.

* * * * *